Figure 1:
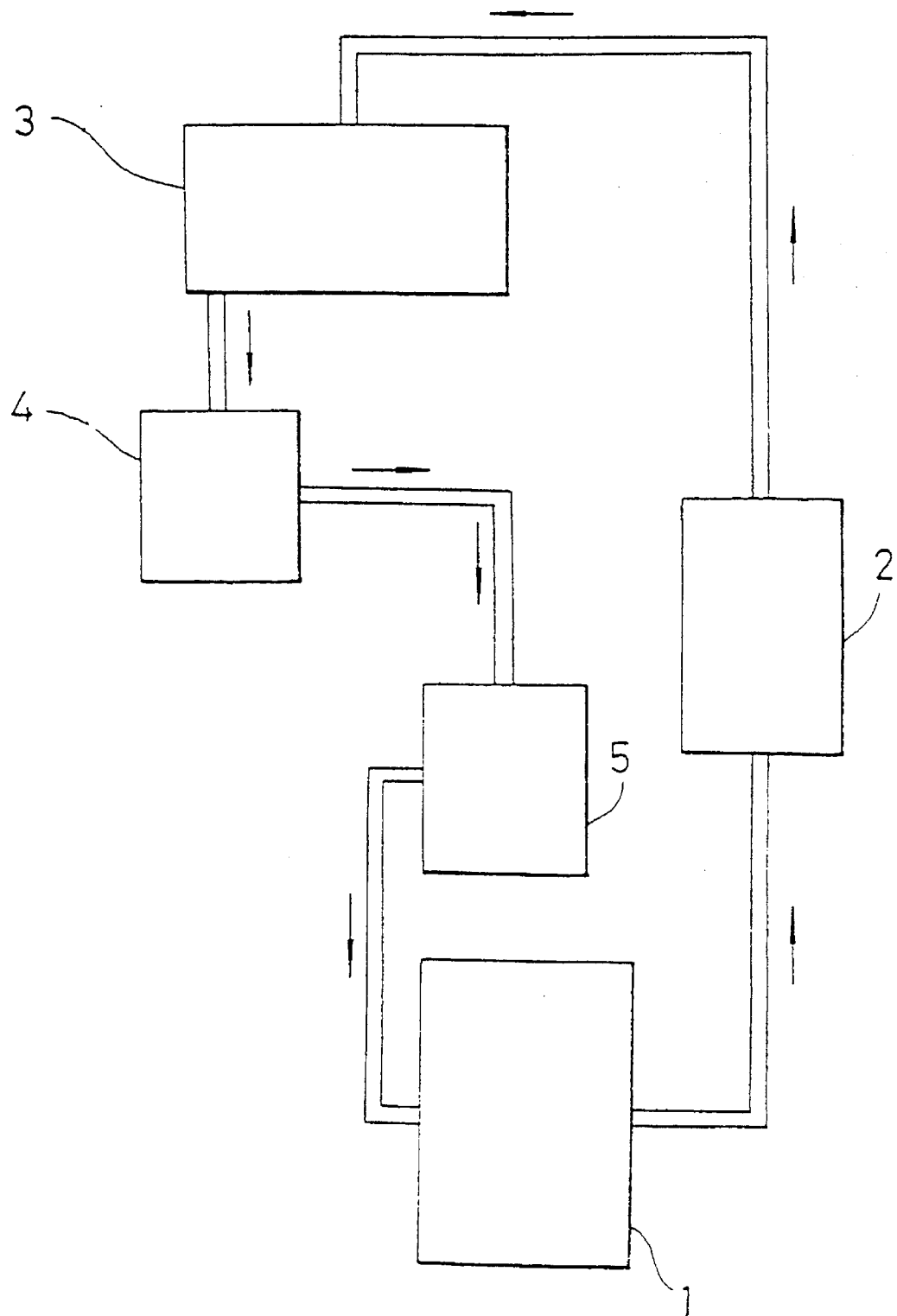

United States Patent [19]
Kuboyama

[11] Patent Number: 5,572,923
[45] Date of Patent: Nov. 12, 1996

[54] HEALTH BEVERAGE THAT AN EXTRACTED INGREDIENT FROM PLANT, ANIMAL OR MINERAL IS MAJOR INGREDIENT, AND MANUFACTURING METHOD AND APPARATUS THEREFOR

[76] Inventor: Nobuyoshi Kuboyama, 96 Litchfield Dr., Carlisle, Mass. 01741

[21] Appl. No.: 495,068

[22] Filed: Jun. 26, 1995

Related U.S. Application Data

[63] Continuation-in-part of Ser. No. 286,001, Aug. 4, 1995.

[51] Int. Cl.⁶ ................................................ A47J 31/34
[52] U.S. Cl. .............................................. 99/287; 99/295
[58] Field of Search ................................. 99/275, 277.1, 99/277.2, 279, 280, 295, 323.1, 323.2, 323.3, 323.4, 467, 468, 469, 470, 473, 474, 475, 476, 286

[56] References Cited

U.S. PATENT DOCUMENTS

| | | | |
|---|---|---|---|
| 3,044,878 | 7/1962 | Knedlik | 99/323.2 |
| 4,068,010 | 1/1978 | Karr | 99/323.2 |
| 4,776,104 | 10/1988 | Kuboyama | 34/77 |
| 5,170,697 | 12/1992 | Kuboyama | 99/470 |
| 5,214,998 | 6/1993 | Knoeda | 99/476 |
| 5,219,758 | 6/1993 | Kuboyama | 435/302 |
| 5,308,160 | 5/1994 | Weiss | 99/275 |

*Primary Examiner*—Robert W. Jenkins
*Attorney, Agent, or Firm*—Nields & Lemack

[57] ABSTRACT

Apparatus and method for manufacturing a health beverage, a food additive, and/or a perfume containing a very small amount of effective ingredient by extracting from various useful materials the effective ingredient. Water is heated and atomized, and contacts the raw material such as soy bean under decompression. The atomized water is then liquid-cooled and collected.

6 Claims, 7 Drawing Sheets

HEALTH BEVERAGE THAT AN EXTRACTED INGREDIENT FROM PLANT, ANIMAL OR MINERAL IS MAJOR INGREDIENT, AND MANUFACTURING METHOD AND APPARATUS THEREFOR

This application is a continuation-in-part of pending U.S. Ser. No. 08/286,001 filed Aug. 4, 1995.

INDUSTRIAL APPLICABILITY

The present invention relates to a health beverage, a perfume or a food additive that has as an effective ingredient an ingredient extracted from a plant material, animal material or mineral material.

BACKGROUND ART

A certain material of some kind among a plant material, animal material or mineral material includes some ingredient particularly effective for human health, for flavoring of foods, and for perfumes. However, many of these materials cannot be directly provided as a food or food additive, or even if it is possible to provide them in edible form, it is inconvenient in most cases. For this reason, heretofore some attempt has been made to extract such ingredients using various extracting methods.

For instance, Korean ginseng is made either by extracting the ingredient by boiling for a long time at a high temperature into water, or the extraction of the effective ingredient is carried out by a distilling method or a solution extracting method.

However, there has been a problem that an ingredient included in a material cannot be effectively picked up by conventional extracting methods. That is, various plant materials, animal materials or mineral materials which are useful for maintaining human health, for providing flavor, or as an effective ingredient in perfume, contain an ingredient which would be destroyed at high temperature, or a very small amount of active ingredient which may not be found utilizing current analyzing techniques.

Accordingly, for instance, in the case of extracting an ingredient by boiling Korean ginseng, or in the case of extracting an ingredient by a boiling method, the extraction of material which cannot tolerate high temperature is impossible.

And, since an exact analysis of the ingredient is required in the solution extracting method, for instance, the extraction of very small amounts of unknown material contained within the Korean ginseng and other materials is impossible.

For this reason, despite the knowledge that some kinds of effective material are useful for maintaining human health, for adding flavor to food, and for providing a pleasant scent for perfume, the present state of the art is such that effective utilization of such materials cannot be accomplished. The present invention has been accomplished in view of this background.

SUMMARY OF THE INVENTION

Therefore, it is an object of the present invention to provide apparatus and a technique for manufacturing a health beverage, a food additive, and/or a perfume containing a very small amount of effective ingredient by extracting from various useful materials the effective ingredient, which could not have been extracted by conventional techniques. It is a further object of the present invention to provide a health beverage, a food additive, and/or a perfume containing the extracted effective ingredient.

The manufacturing apparatus comprises: a pulverizing minute particle generating tank including means for heating a reservoir of water to a predetermined temperature and a means for pulverizing or atomizing water; an extracting device connected to the pulverizing minute particle generating tank, which extracting device holds a raw material layer for adhering an effective ingredient of raw material to the pulverized minute particles as the pulverizing minute particles pass through the raw material layer; a condensing device connected to the extracting device for liquefying the pulverized minute particles that have passed through and extracted an effective ingredient from the raw material layer; a reserve tank into which the water liquefied at the condensing device empties; a blower provided in a path between the reserve tank and the pulverizing minute particle generating tank for decompressing the raw material layer within the extracting device; and a cooling means for cooling the condensing device and the reserve tank.

The manufacturing method of the product of the present invention comprises the following processes:

(a) a process for generating pulverized minute particles of water in a pulverizing minute particle generating tank including a heater for heating a reservoir of water to a predetermined temperature and a means for pulverizing water;

(b) a process for sucking and extracting out the effective ingredient within a raw material to the surface of the raw material by decompressing the raw material layer formed of crushed pieces such as plant material, animal material or mineral material filled with the pulverized minute particle into the extracting device;

(c) a process for holding the effective ingredient sucked and extracted out to the surface of the raw material to the pulverized minute particle by passing the pulverized minute particle through the raw material layer by feeding the pulverized minute particle together with an air flow circulating between each device to the raw material layer residing in a decompressed condition;

(d) a process for liquefying the resulting pulverized minute particle containing the effective ingredient by feeding the same to a cooled condensing device;

(e) a process for obtaining a finished product by emptying water liquefied at the condensing device and containing an effective ingredient of various raw materials into the reserve tank; and (f) a process for returning the pulverized minute particle which was not liquefied at the condensing device to the pulverizing minute particle generating tank.

Figure 2:
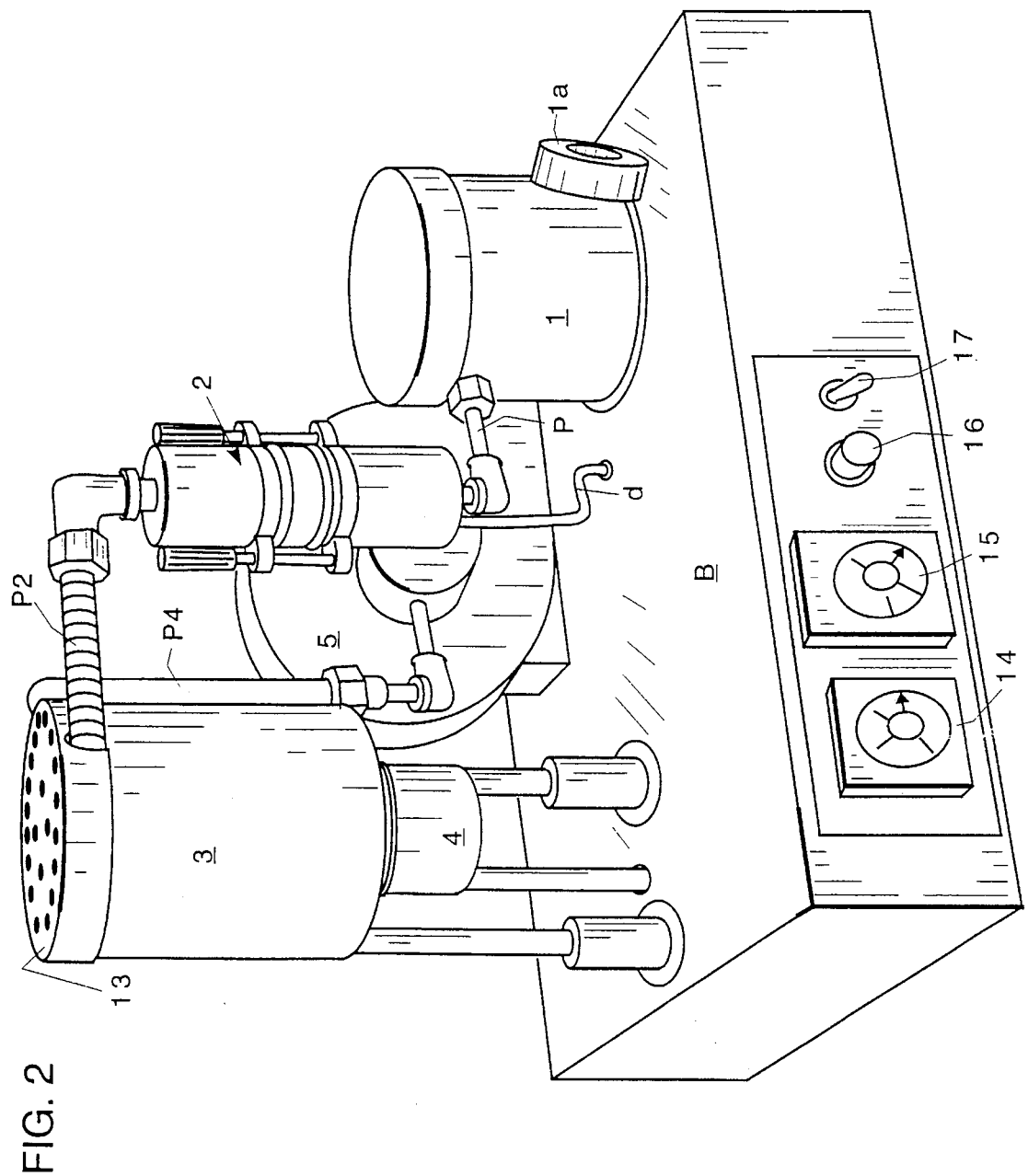
Figure 3:
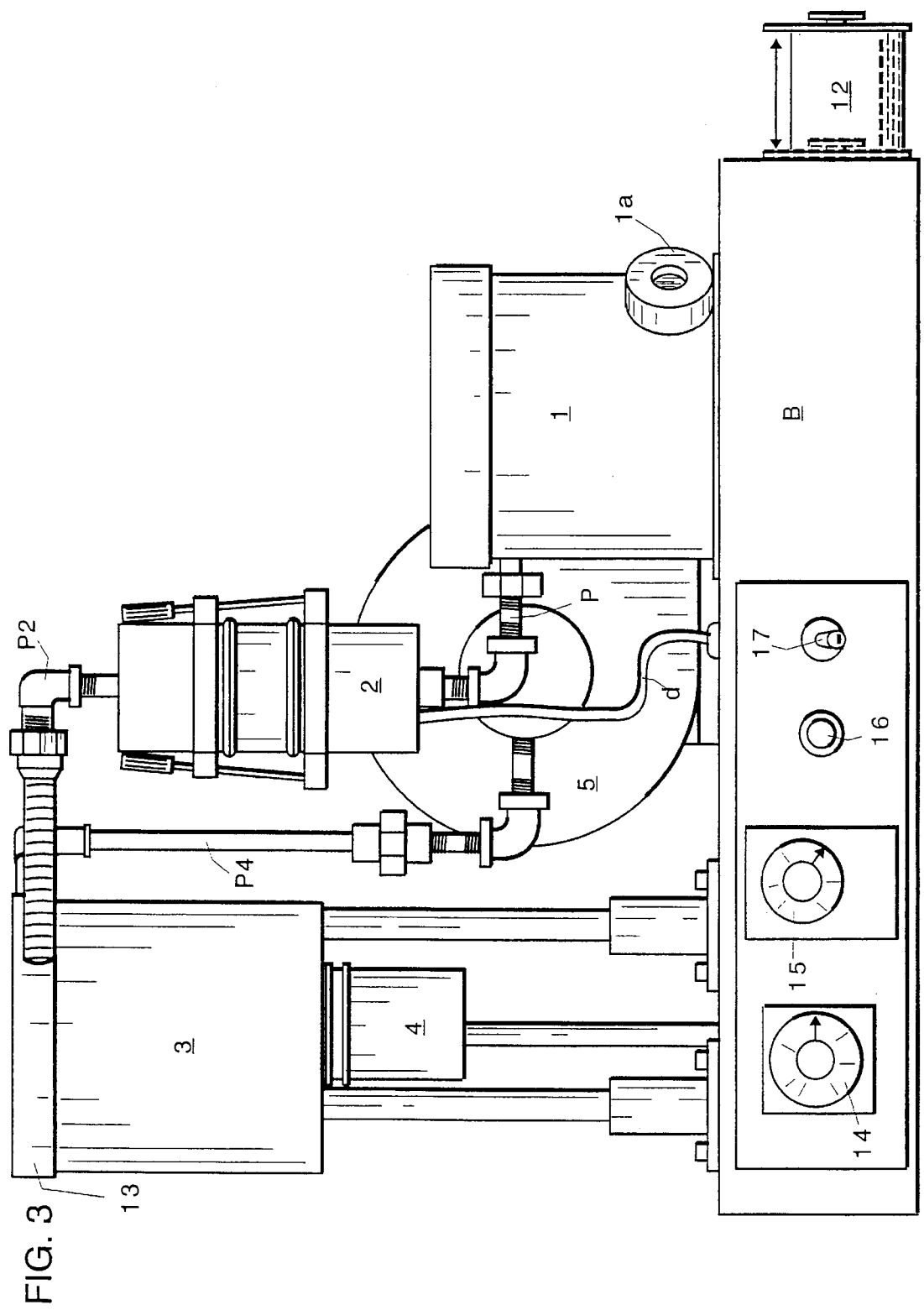
Figure 6:
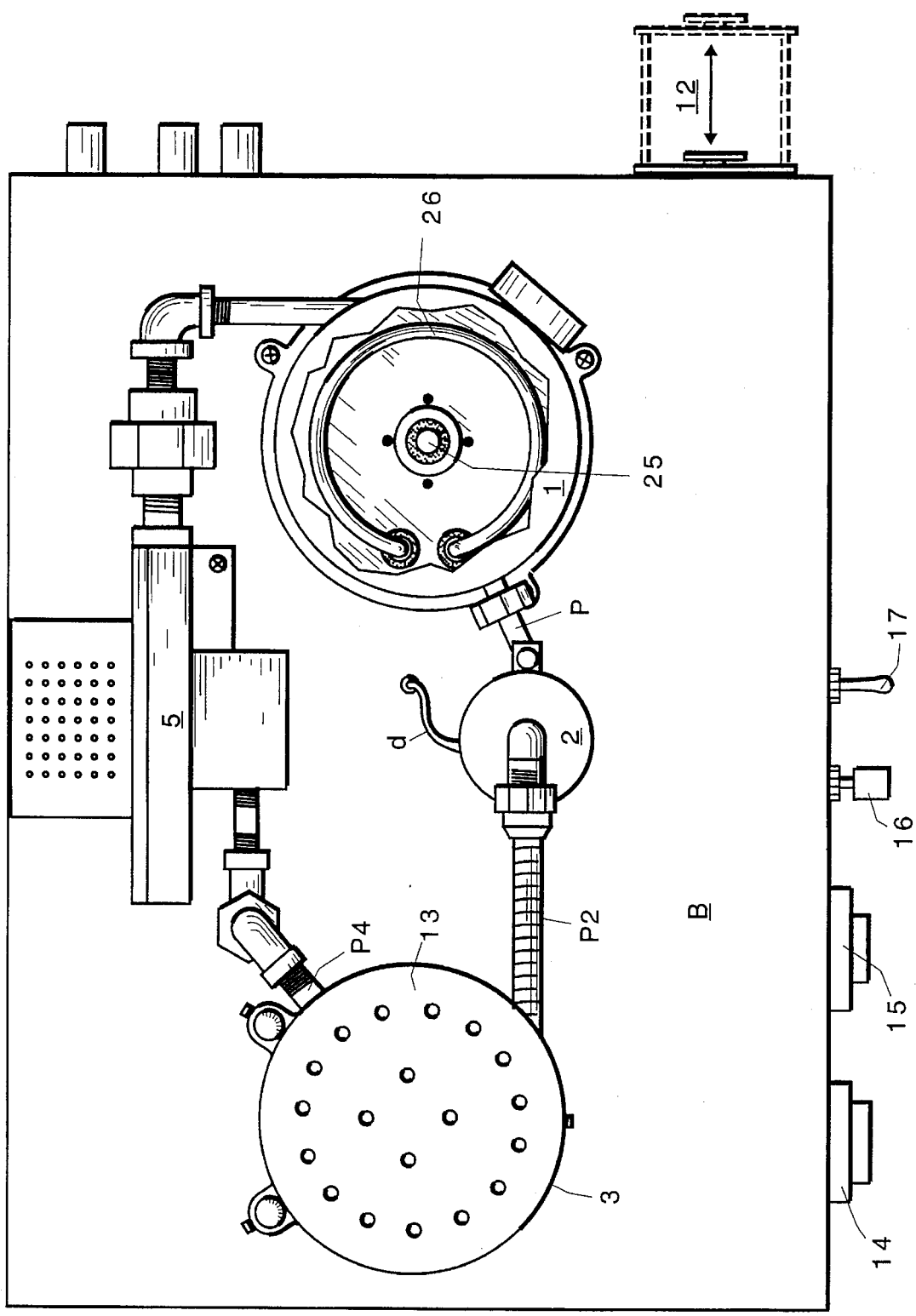
Figure 7:
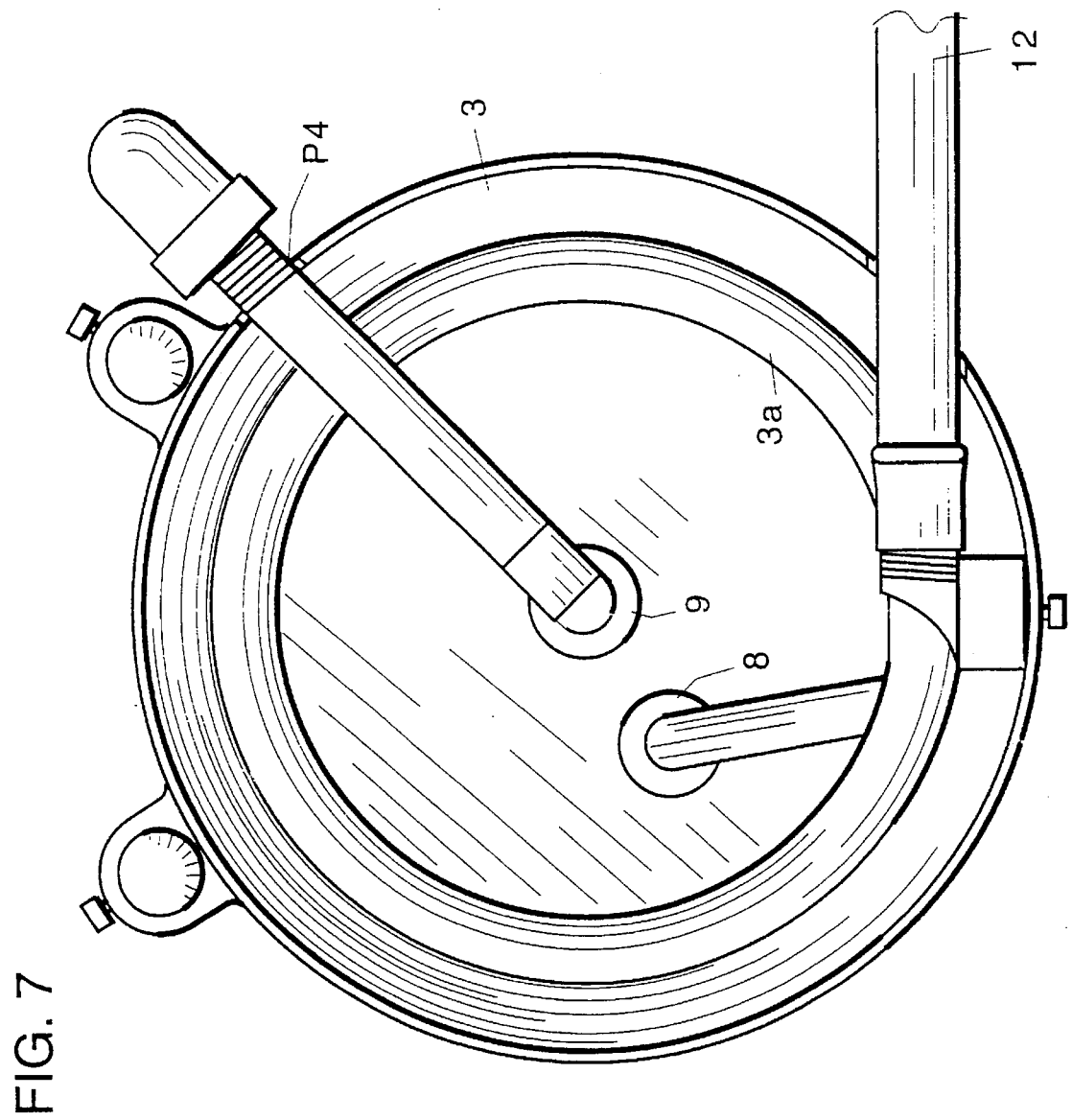

The health beverage, flavor enhancer or perfume is manufactured by:

(a) a process for generating a pulverized minute particle of water in a pulverizing minute particle generating tank including a heater for heating a reservoir of water to a predetermined temperature and a means for pulverizing water;

(b) a process for sucking and extracting out the effective ingredient within the raw material to the surface of the raw material by decompressing the raw material layer formed of crushed pieces such as plant material, animal material or mineral material filled with the pulverized minute particle into the extracting device;

(c) a process for holding the effective ingredient that has been sucked and extracted out to the surface of the raw material to the pulverized minute particle by passing the pulverized minute particle through the raw material layer by feeding the pulverized minute particle together with an air flow circulating between each device to the raw material layer residing in a decompressed condition;

(d) a process for liquefying the pulverized minute particle by feeding the pulverized minute particle containing the effective ingredient to a cooled condensing device;

(e) a process for returning the pulverized minute particle which was not liquefied at the condensing device to the pulverizing minute particle generating tank; and thereby containing a very small amount of active ingredient that analysis and detection were not impossible using conventional techniques, and therefore creating a very useful beverage for maintaining human health, flavor additive or perfume.

BRIEF DESCRIPTION OF THE DRAWINGS

FIG. 1 is a block diagram showing a construction of the manufacturing apparatus and manufacturing method thereof;

FIG. 2 is a perspective view of the manufacturing apparatus in accordance with the present invention;

FIG. 3 is a front view of the manufacturing apparatus in accordance with the present invention;

FIG. 4 is a fragmentary perspective view of an external cylinder of an extracting device in accordance with the present invention;

FIGS. 5(*a*), (*b*) and (*c*) are perspective views showing the construction of the internal cylinder of an extracting device in accordance with the present invention;

FIG. 6 is a top view of the manufacturing apparatus in accordance with the present invention; and FIG. 7 is a top view of a cooling device in accordance with a preferred embodiment of the present invention.

DETAILED DESCRIPTION OF THE PREFERRED EMBODIMENTS

Hereinafter, a preferred embodiment of the present invention will be described in more detail with reference to the accompanying drawings. FIG. 1 is a block diagram showing a construction of a first embodiment of the manufacturing apparatus, and in the drawing, reference numeral 1 is a pulverizing minute particle generating tank, reference numeral 2 is an extracting device for extracting an effective ingredient from raw material by a pulverized minute particle of water sent from the pulverizing minute particle generating tank 1, reference numeral 3 is a condensing device for liquefying the pulverized minute particle holding the effective ingredient within the raw material transferred from the extracting device 2, reference numeral 4 is a reserve tank for emptying water liquefied at the condensing device 3 and containing the effective ingredient extracted from the raw material from the condensing device 3, and reference numeral 5 is a blower or fan provided between the reserve tank 4 and the pulverizing minute particle generating tank 1 for establishing air flow in the closed path and for establishing a state of decompression at the extracting device 2. As shown in the drawing, each device such as the pulverizing minute particle generating tank 1 and the extracting device 2 is respectively connected by a connecting pipe, so that a circulating path is formed around the pulverizing minute particle generating tank 1, and it is made such that the pulverized minute particle circulates together with the air flow via operation of the blower in this circulating path.

Turning now to FIGS. 2, 3 and 6, reference numeral 1 is a pulverizing minute particle generating tank supported on base B and comprising a water tank preferably made of stainless steel. The size of the water tank is not particularly limited, and generally depends upon the amount of raw material used and the desired rate of extraction of effective ingredient. The tank 1 includes a view port 1*a* which allows visualization of the water level in the tank. Means 25 is provided in association with the pulverizing minute particle generating tank 1 to generate pulverized minute particles of water so as to create a mist. Suitable means include an ultrasonic wave generating device comprising one or more sets (depending upon the tank size) of vibrators provided at the bottom of water tank 1, each vibrator having the ability to pulverize water and create a mist. Conventional ultrasonic wave generators that are used in domestic ultrasonic humidifiers are suitable. Centrifugal atomization could also be used. A heater of any suitable means 26 is also provided in association with the pulverizing minute particle generating tank 1 for maintaining the water temperature therein at a predetermined temperature. The heater is coupled to a gauge 14 and switch 17 on base B. The gauge 14 allows the operator to specify the desired water temperature, and the switch 17 activates the heater. Reference numeral 2 is an extracting device to be described in detail below, and is in communication with the pulverizing minute particle generating tank 1 via pipe P. The extracting device 2 drains through flexible plastic hose d connected to a discharge water tank 12 (FIG. 3). Preferably the discharge water tank 12 is in the form of a drawer in the base of the apparatus for ease of emptying. Reference symbol P2 is a pipe providing communication between extracting device 2 and condensing device 3, described in greater detail below. Condensing device 3 is supported on base B and is preferably equipped with a cover 13 (FIG. 6) having a plurality of apertures therein.

FIG. 4 is a perspective view of the external appearance of the external cylinder which is the main element of the extracting device 2, and it includes a first external cylinder 2*a* and a second external cylinder 2*b*, both of which are constructed so as to be releasably joined to one another, and are preferably made of stainless steel. A temperature sensor (not shown) for detecting the temperature during the extraction operation can be fixed to the bottom side of the second external cylinder 2*b*. A hinged locking mechanism C1 joins cylinder 2*a* to cylinder 2*b* so that the raw material can be easily loaded and unloaded therefrom. FIG. 4 shows the extracting device 2 in its open, unlocked position.

FIG. 5 is a schematic diagram of the internal cylinder which is housed in the external cylinder 2 of FIG. 4. FIG. 5(*a*) shows internal cylinder 2*c*, which is of a suitable shape and size to fit into the aforementioned external cylinder 2, and includes at the bottom thereof a net portion for holding the raw material that has been crushed into small pieces. FIG. 5(*b*) shows a guide plate 2*d* for insertion into the internal cylinder 2*c*, and as shown in FIG. 5(*c*), it is constructed so as to partition the crushed pieces S of raw material such as soy beans, malts or Korean ginseng in the interior of the internal cylinder 2*c*. The presence of this guide plate 2*d* allows the pulverized minute particle to easily and smoothing pass through the crushed pieces S of raw material as will be described below. Those skilled in the art will appreciate that other shapes for guide plate 2*d* may be used, such as a spiral shape.

FIG. 7 is a top view of a preferred embodiment of the interior of the cooling chamber 3. Pipe P2 from the extraction device 2 communicates with a conduit 3a, that preferably spirals down the inside diameter of the chamber 3 as shown. Other configurations of the conduit 3a in the chamber 3 are possible; the conduit 3a can be vertically positioned in the chamber 3, for example. At the bottom of the cooling chamber 3, the conduit 3a terminates in an aperture 8 of the chamber 3, allowing the fluid in it to communicate with reserve tank 4 removeably coupled to the bottom of the chamber as shown in FIGS. 2, 3 and 6. Preferably the conduit 3a is water cooled, simply by filling the void in chamber 3 with cold water. Other liquids can be used to cool the conduit 3a, including oil and ethylene glycol. Also at the bottom of cooling chamber 3 is a second aperture 9, which allows for communication between reserve tank 4 and fan 5 via pipe P4, which extends up through the chamber 3 as shown.

The fan or blower 5 is supported on base B and should be of a sufficient size so as to create the decompression and provide flow through the system. The decompression should be within the range of about 5 to 500 mm $H_2O$. A conventional domestic vacuum cleaner fan has been found to be effective.

The operation of the apparatus will now be described based upon the above construction, and also a preferred embodiment of the beverage manufacturing method will be described.

Figure 5A:
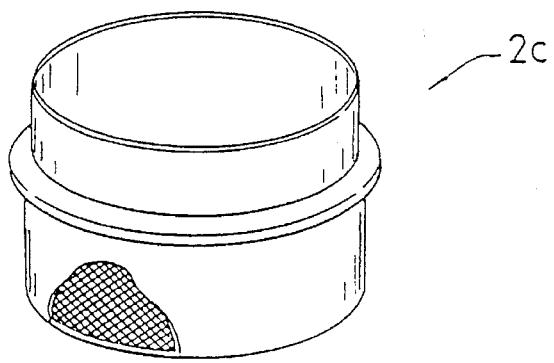
Figure 5B:
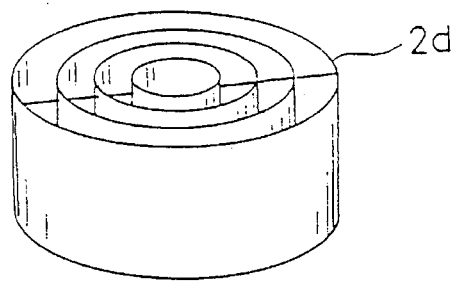
Figure 5C:
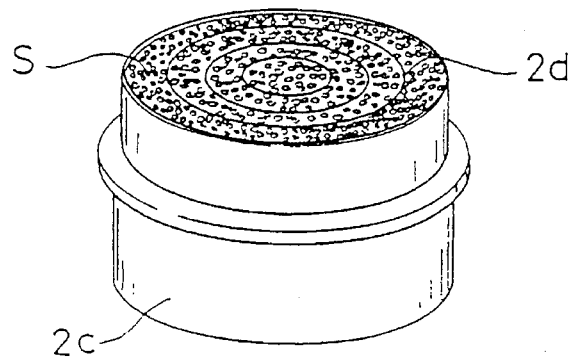

First, raw material, which can include herbs, vegetables, seaweed, corn, meat, fish, shellfish, soy beans, etc. is crushed to a magnitude approximating rice grains by any suitable means and is filled into the internal cylinder 2c illustrated in FIG. 5(a). Once filled, the net is placed over the raw material in order to stably maintain it in the internal cylinder 2c.

Figure 4:
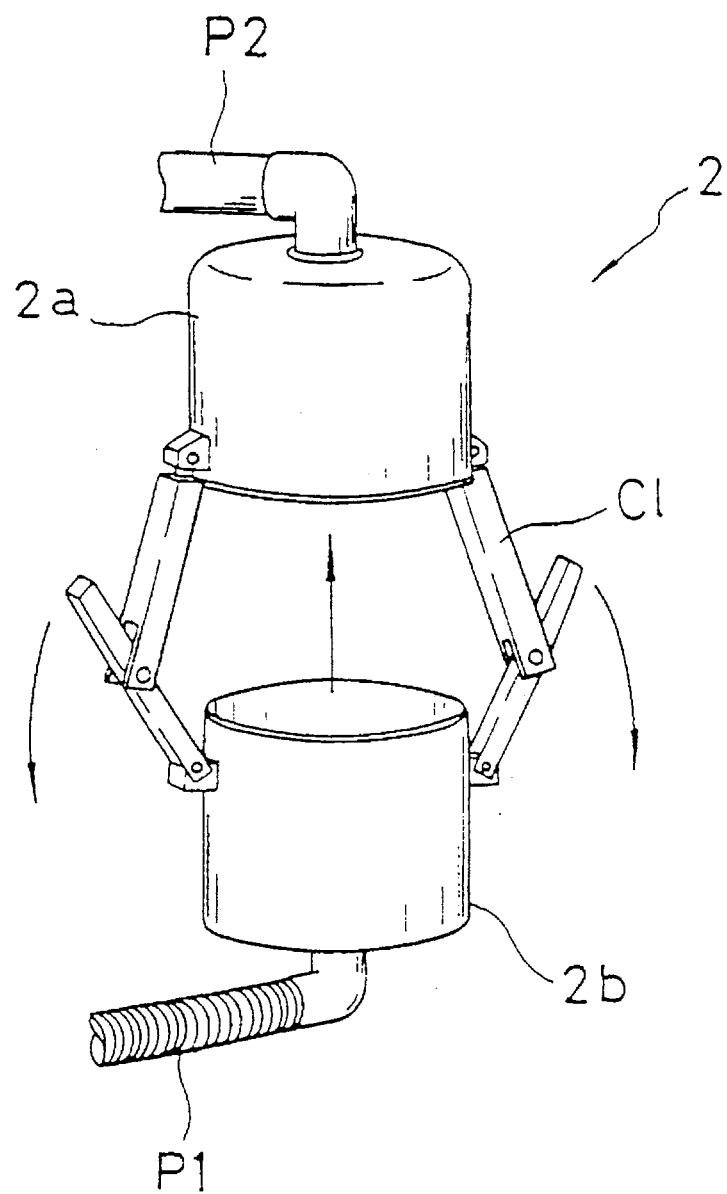

Successively, the internal cylinder 2c is inserted into the external cylinder 2 shown in FIG. 4. The pulverizing minute particle generating tank is filled with a sufficient amount of water (as viewed through port 1a) so that a mist can be produced. The water can be maintained at the same level continuously, or can be added batchwise. The temperature gauge 14 is set to the desired temperature, and the heater is activated by switch 17 to heat the water to a suitable temperature such that the temperature in the extracting device 2 is at such a level (generally below 100° C.) as to not destroy the effective ingredients of the raw material. For example, in the case of soy beans, the temperature of the water is preferably heated to about 85° C., so that the temperature of the water when it reaches the extracting device is between about 60°–70° C., preferably about 65° C.

Once the water temperature in the water tank of the pulverizing minute particle generating tank 1 reaches the desirable level, the ultrasonic wave generating device or the like and the blower 5 are activated by switch 16. Timer 15 is set to the desired run time and is also activated by switch 16. The blower 5 causes an air flow to circulate in the closed circulating path formed by the pulverizing minute particle generating tank 1, the extracting device 2, the condensing device 3, the reserve tank 4, and the blower 5, as well as the pipes connecting these respective devices. The pulverized minute or atomized particles or mist of water generated at the pulverizing minute particle generating tank 1 thus pass through pipe P together with the air flow and reach the extracting device 2. The temperature in the extracting device 2 can be measured by a temperature sensor to ensure that the appropriate temperature is reached therein. As stated above, the temperature in the water tank of the pulverizing minute particle generating tank 1 is controlled in response to the temperature in the extraction device 2.

As described above, the air flow is circulated between each device by the operation of the blower 5, but since the extracting device 2 is filled with the crushed particles S of raw material, the raw material creates a resistance to the air flow, thereby creating a decompressed space within the extracting device 2.

Once the decompressed state is achieved, a known ingredient and an unknown ingredient within the raw material are extracted to the surface of the crushed pieces S of raw material, and are then captured by the pulverized minute particles of water passing therethrough. Since the temperature within the extracting device, and more particularly, the temperature within the internal cylinder 2c is maintained within the desired range, the ingredients contained in the raw material are extracted into the pulverized minute particles without being destroyed by heat.

The atomized or pulverized minute particles containing the effective ingredient of the raw material then flow to the conduit 3*a* of the cooling chamber 3 through the connecting pipe P2 together with the air flow from the blower 5. The cooling chamber 3 is filled with cooling liquid, preferably water, at a temperature sufficient to cause condensation of the pulverized minute particles in the conduit 3*a*. The liquefied or condensed pulverized minute particles drain through aperture 8 into the reserve tank 4. The reserve tank 4 is preferably removeably sealed to the chamber 3 so as to maintain the product therein in a sanitary condition. The cooling chamber/conduit assembly described above results in a two to three times higher production rate than an air cooled assembly.

The pulverized minute particles which are not liquefied in the condensing device 3 are sucked towards the blower 5 through the connecting pipe P4 together with the air flow, and are recycled to the pulverizing minute particle generating tank 1. The recycled portion optionally can be preheated such as by a rectifying plate or spiral shape, so as not to lower the temperature of the water in the tank 1.

As described above, the pulverized minute particles circulate in the circulating path so that the effective ingredient of the raw material such as soy bean is captured into the pulverized minute particles, and a health beverage, food additive or perfume containing the effective ingredient of the soy bean is obtained by liquefying these pulverized minute particles. In the case where soy beans are the raw material, one complete cycle takes about 26 minutes, and thus timer 16 is set accordingly. Preferably the cooling water in the condensing device 3 is changed every cycle. Alternatively, a continuous flow of cooling water can be used to cool the conduit 3*a*.

As stated above, the raw material can be crushed to about the size of rice grain. However, the concentration of effective ingredient contained in the final product can be controlled by varying the size of the raw material. For example, if the raw material is crushed into fine pieces, a final product high in effective ingredient concentration can be obtained. However, in such a case the rate of final product produced decreases. As the size of the raw material increases, the concentration of effective ingredient in the final product decreases, and the rate of production increases. Similarly, the use of the guide plate 2*d* increases the yield of final product per hour by about 20%, but the concentration of effective ingredient in the final product decreases.

The final product is a colorless, transparent and clear liquid containing a known material and an unknown active material which has not been analyzed or further extracted.

The health beverage refined from the raw material has a noticeable efficacy, and numerous examples of an activation of human cell are reported as a result of drinking after meals final product diluted by adding 5 cc to 180 cc of water. The resulting beverage has a vague smell and a faint flavor of the raw material, such as soy bean flavor, when it is drunk by adding the same to mineral water and the like.

In the above described embodiment, although soy bean is mentioned as a raw material, the present invention is not to be so limited, as it is possible to manufacture entirely new beverages, by using various materials known to contribute to human health from ancient times. The present invention can obtain a health beverage which is particularly effective and novel for maintaining human health by extracting an ingredient from various materials which could not be extracted heretofore by the construction and operation as described above.

What is claimed is:

1. Apparatus for extracting an ingredient from a raw material selected from the group consisting of plant, animal and mineral, comprising:

pulverizing minute particle generating means comprising a water tank, means for heating water to a predetermined temperature, and means for pulverizing said water;

extracting means in fluid communication with said pulverizing minute particle generating means, said extracting means containing said raw material;

condensing means in fluid communication with said extracting means, said condensing means comprising a liquid-cooled conduit;

a reserve tank in fluid communication with said liquid-cooled conduit for containing product that has been liquified by said condensing means; and blower means in fluid communication with said condensing means and with said pulverizing minute particle generating means.

2. The apparatus of claim 1, wherein a closed circulation path is formed amongst said pulverizing minute particle generating means, said extracting means, said condensing means, and said blower means, and wherein an air flow is circulated by said blower means.

3. The apparatus of claim 2, wherein said extracting means comprises and external cylinder including a first external cylinder in fluid communication with said pulverizing minute particle generating means and a second external cylinder in fluid communication with said condensing means, and an internal cylinder contained within said external cylinder, said internal cylinder receiving said raw material.

4. The apparatus of claim 1, wherein said liquid-cooled conduit is cooled with water contained in said condensing means and surrounding said conduit.

5. The apparatus of claim 1, wherein said means for heating water heats said water when said water is in said water tank.

6. The apparatus of claim 1, wherein said means for pulverizing water pulverizes said water when said water is in said water tank.

* * * * *

Disclaimer and Dedication 5,572,923—Nobuyoshi Kuboyama, 96 Litchfield Dr., Carlislp, Mass. 01741. HEALTH BEVERAGE THAT AN EXTRACTED INGREDIENT FROM PLANT, ANIMAL OR MINERAL IS MAJOR INGREDIENT, AND MANUFACTURING METHOD AND APPARATUS THEREFOR. Patent dated November 12, 1996. Disclaimer and Dedication filed on October 8, 2002, by the inventor.

Hereby disclaims and dedicates to the Public all claims of said patent.

*(Official Gazette, July 22, 2003)*